Nov. 29, 1938.　　　F. PEDATELLA　　　2,138,479
CHANGE-OVER ASSEMBLY
Filed March 17, 1937　　　3 Sheets-Sheet 1
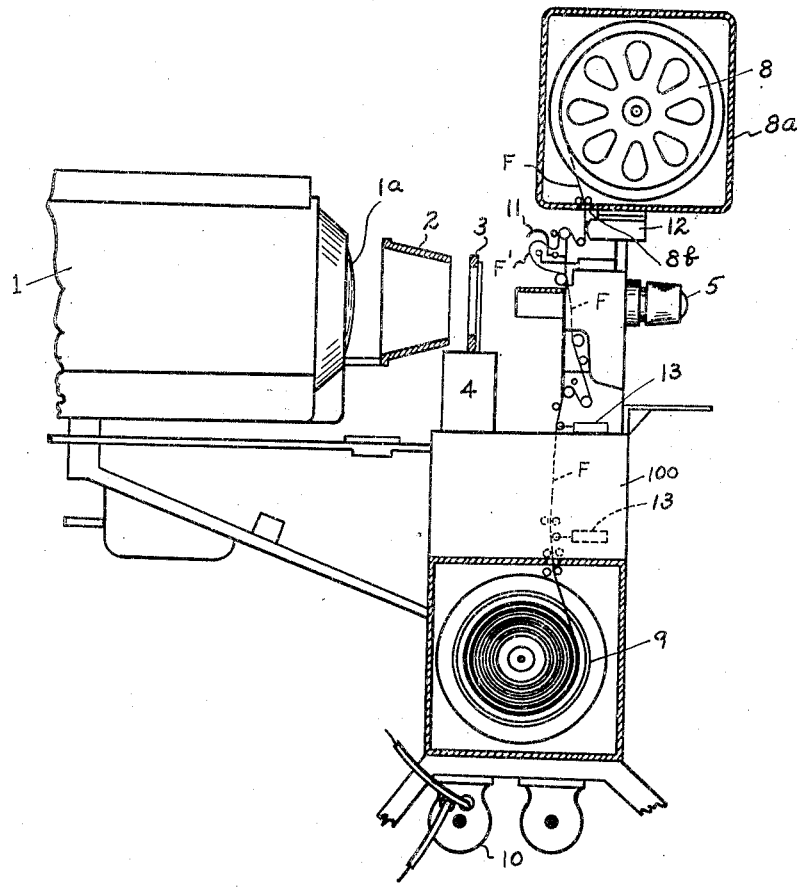
Fig. I.
INVENTOR
Frank Pedatella
BY Christy and Wharton
ATTORNEYS Nov. 29, 1938.   F. PEDATELLA   2,138,479
CHANGE-OVER ASSEMBLY
Filed March 17, 1937   3 Sheets-Sheet 2
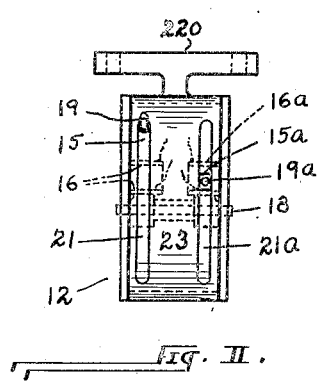
Fig. II.
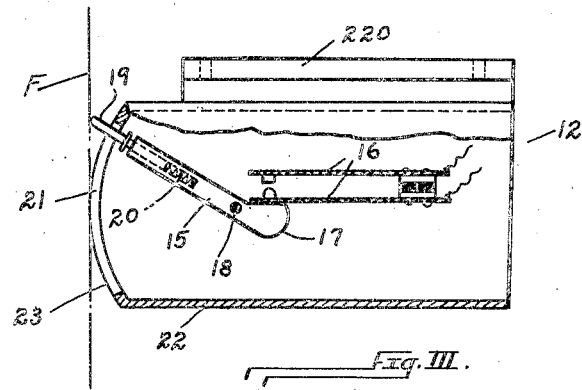
Fig. III.
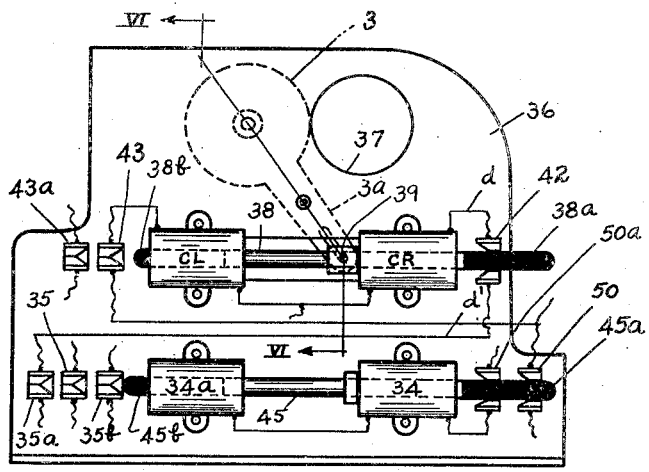
Fig. IV.
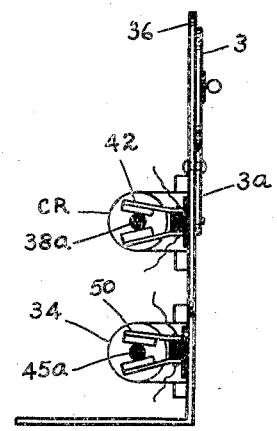
Fig. V.
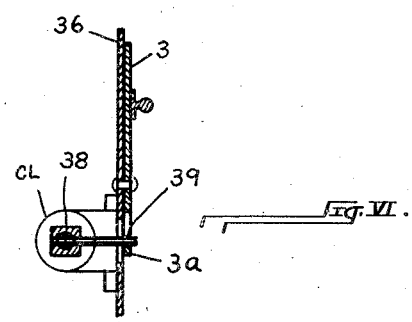
Fig. VI.
INVENTOR
Frank Pedatella
BY Christy and Wharton
ATTORNEYS

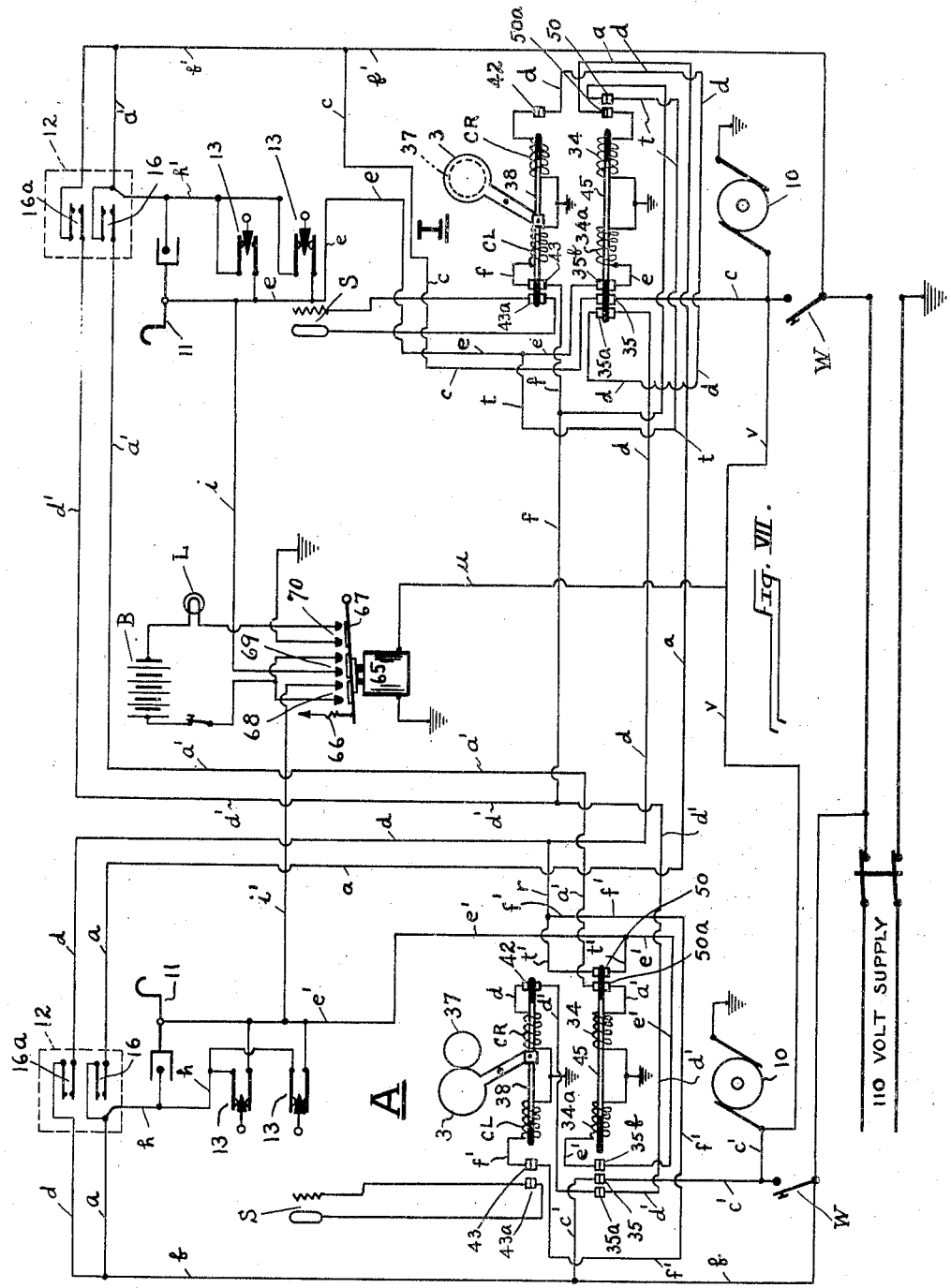

Patented Nov. 29, 1938

2,138,479

UNITED STATES PATENT OFFICE 2,138,479

CHANGE-OVER ASSEMBLY

Frank Pedatella, New Kensington, Pa., assignor to Wilbert C. Black, New Kensington, Pa.

Application March 17, 1937, Serial No. 131,364

11 Claims. (Cl. 88—17)

My invention relates to automatic changeover apparatus; that is, apparatus for changing over from one reel of film to another in motion picture projection.

In application for Letters Patent of the United States, Serial No. 40,260, filed by me on the 12th day of September, 1935, I illustrate and describe a changeover apparatus of simplified and economical construction, an apparatus which is wholly automatic in its operation, and is safeguarded from destructive effects which may result from abnormal conditions of the film or mechanism associated with the film. More particularly, my present invention consists in refinements and simplifications in apparatus of this kind.

Whereas the apparatus disclosed in my above-noted application employs two shutters for each projector, the apparatus of this invention, advantageously, employs only one. In the apparatus of my present invention, the signal shutter, organized between the light source and the film, is prevented from moving into open position until the film-advancing motor is in operation, and such motor is automatically started and brought up to normal film-advancing speed before the shutter is opened.

Essentially apparatus of the sort alluded to includes film-operated switches and electro-magnetic switches, and it will be further understood that my invention embraces particular refinements in such switches and in their organization in the apparatus, by virtue of which all interference with the usual sound equipment of the projector is avoided, and the tension on the traveling film reduced to a minimum. These and other features of invention will appear in the following specification.

In the accompanying drawings, Fig. I is a view, partly in side elevation and partly in vertical section of a projection assembly comprising, esentially, a lamp or other light source, a housing therefor, a projection lens and mounting, motor driven means for advancing film between the light source and the projection lens, and a shutter arranged between the light source and the film.

Fig. II is a view in front elevation of a film-operated trigger or switch mechanism included in the apparatus; and Fig. III is a view of the same, partly in vertical section and partly in side elevation.

Fig. IV is a view in rear elevation of the shutter structure which is mounted between the light source and the film, and of electrical control elements associated with, and operated in accordance with the movement of, the shutter. Fig. V is a view in side elevation of the shutter structure; and Fig. VI is a fragmentary sectional view thereof, taken on the broken plane VI—VI of Fig. IV.

And Fig. VII is a wiring diagram, showing the wiring of two projection assemblies, together with the motors, the energizing circuits for the sound-producing equipment of the assemblies, and the conductors and contacts for effecting normal changeover between such motors and sound producers, together with circuits and contacts for controlling the shutters of the two assemblies.

Referring to Fig. I of the drawings, reference numeral 1 designates a lamp-house having therein a light source for producing an image-projecting light-beam. Mounted before opening 1a of the lamp-house is a funnel-shaped light-shield 2, before which is mounted shutter mechanism designated generally by reference numeral 3, and actuated by mechanism housed in a casing 4, which serves as a mounting pedestal for the shutter. In axial alignment with light-shield 2 and shutter 3 is an assembly, of usual sort, carrying a projecting lens 5.

The film, designated by reference letter F, is taken from a supply reel 8 by a winding reel 9 actuated by motor 10. The above elements, broadly considered, are well known in the art, and are found in one form or another in standard projection assemblies. And in accordance with known practice, two projection assemblies are provided. While one is in operation, the other stands ready to continue the operation when the reel of film of the first has been run to its end. As usual, in providing safety control for the assemblies, I provide a plurality of film-operated, automatic safety switches, or traps, arranged to control the operation of safety mechanism for preventing fire hazards due to abnormal conditions of the film; and, as is also usual, I provide means acted upon by the film, automatically to effect a changeover from one projection assembly to another. In my assembly, however, the several film-operated safety switches, or traps, are of novel and particularly efficient structure, and the film-operated means for initiating normal changeover are of simplified structure, and are arranged in a particularly effective organization with the several elements of the projection assemblies.

Referring still to Fig. I of the drawings, reference numeral 11 designates generally a safety switch, or trap, positioned adjacent the supply reel 8, and effective upon abnormal condition of a loop F' of the film. The physical assembly of a trigger mechanism for initiating normal changeover is shown diagrammatically, and is designated generally, by reference numeral 12. A pair of safety switches, or traps, 13, 13 is shown diagrammatically, one adjacent the winding reel 9 of the projection assembly, and the other above the usual sound equipment within housing 100.

It may be well generally to relate the operations of normal changeover, and the operation of safety control, as automatically performed by my apparatus, before describing in detail the energizing and controlling circuits involved, and the specific mechanism associated with the circuits.

Let us assume that operating conditions in both projectors are normal, and that the film F on the supply reel of the active projector approaches exhaustion. At a substantial interval before complete exhaustion of the film, trigger mechanism 12 acts, under the influence of the film, to complete a circuit to the motor of the inactive projection assembly. This lead gives time for the film-advancing motor of the inactive assembly to gather speed before that assembly is called into active service. Such starting of the motor of the inactive projection assembly is effected by elements of the safety control mechanism associated with that assembly. At this point it may be remarked that, in my automatic changeover and safety control, the safety control performs a dual function, taking part in the sequential progress of normal changeover, as well as performing its safety function.

More specifically, as the active projection assembly approaches the end of a particular operation or run, the film acts upon trigger mechanism 12, to initiate such action that a movable part of the mechanism is shifted. This shifting effects, while the active projection assembly is still in operation, the energizing of the motor of the inactive projection assembly. As the motor and the travel of the film of the inactive assembly attain normal operating speed, a second movable part of the trigger mechanism 12 is shifted, with the consequence and effect that the shutter 3 of the inactive projection assembly is opened and operation of the sound equipment initiated (that is, the inactive projector is set in full operation), while simultaneously therewith the shutter of the previously active projection assembly is closed, and the motor and sound equipment thereof are deenergized. Thus, a changeover from one projection assembly to the other is complete.

Initially, I shall refer to the film-operated switch or trigger mechanism, shown in detail in Figs. II and III of the drawings, it being understood that each of the two projection assemblies between which changeover is made is equipped with identical switch mechanism. This switch mechanism, which has been designated generally by reference numeral 12, comprises two pivoted arms 15 and 15a, which are arranged, respectively, to close two pairs of spring contacts 16 and 16a by means of cam terminals 17, which are formed at the proximal ends of the arms 15 and 15a, adjacent to the common pivotal axis 18 of the arms. At their distal ends, the pivoted arms 15 and 15a are severally provided with fingers 19 and 19a, respectively, and each finger is forced outwardly by means of a coil spring 20 mounted in the arm. The fingers 19 and 19a of the two arms 15 and 15a project, respectively, through slots 21 and 21a formed in the curved forward face 23 of a housing 22, in which the arms are mounted.

The housing 22 includes a flanged supporting portion 220, for securing the trigger or switch mechanism 12, in accordance with this invention, immediately below the supply reel 8 and above the projecting apparatus 1, 5 and sound equipment 100 (Fig. I) of the assembly. Indeed, I bolt the supporting portion 220 to the bottom of the housing 8a of the reel 8, in such position that the curved face 23 of the housing 22 lies in vertical alignment with the usual slot 8b through which the film F projects. As shown in Fig. III, the film F passes, in tangential contact with the curved forward face 23 of housing 22, through the slots in which the fingers 19 and 19a project, and is held in such contact by tension imposed upon the film by the usual guiding rollers and feeding wheels.

During operation of a projection assembly, with the parts in the position shown in Fig. III, the fingers 19 and 19a lie at the upper terminals of the slots 23 and 23a in which they move, and bear against the presented face of the film F. It may be noted that the spacing between the arms 15 and 15a, which carry the fingers 19 and 19a, is substantially less than the width of the film.

On the film, adjacent to its supply reel terminal, are two apertures (not shown), spaced from each other longitudinally of the film, and each in line with one of the fingers 19 and 19a. These film apertures lie well within the usual sprocket openings in the film. As the film F approaches exhaustion, the more advanced one of the apertures therein comes into alignment with the finger 19, which is constantly pressed outwardly against the film by its associated spring 20. The finger 19, entering the aperture and being engaged by the advancing film, is carried downward; the arm 15 is rotated about its pivot 18, during a short distance of film travel, whereby the proximal cam surface 17 on the arm acts upon spring contacts 16 to close them, and to complete a circuit, the effect of which will be hereinafter described. It will be perceived that the finger 19, engaged by the film at a point immediately adjacent to the reel housing 8a (Fig. I), is swung about an axis (18, Fig. III) which lies below and in parallelism with the axis of reel 8 (Fig. I).

When the downwardly swinging finger 19 approaches the lower end of slot 21, it is freed, manifestly, of the aperture in the taut, advancing film F. The action is thus momentarily to make and rapidly to break electrical connection through the spring contacts 16. When the second finger 19a is engaged by the second film aperture, it similarly is swung downwardly by the film, momentarily closing its associated contacts 16a, and permitting these contacts to open as the arm swings through the arc predetermined by the tangency of the film with the face 23 of the housing 22.

Referring to the wiring diagram of Fig. VII, it will be seen that the closing of contacts 16 in the switch mechanism of the active assembly A completes a circuit a leading from an electric supply line b to a coil 34 in the safety control mechanism of the inactive assembly I. The effect of such energizing coil 34 is to draw into it a plunger, which permits a pair of spring contacts 35 to close, completing a circuit c from a supply line b' to the motor 10 associated with the inactive assembly. This starts the motor of the inactive assembly, giving it the lead in operation, referred to above. Simultaneously with the closing of contacts 35, a pair of contacts 35a are closed in a circuit d leading from the actuating coil CR of the shutter 3 of the inactive assembly I to the contacts 16a of the switch mechanism 12 of the active assembly A, so that the shutter-closing circuit of the inactive assembly is prepared for immediate closing when the finger 15a (Fig. II) of said switch mechanism 12 of the active assembly A is operated.

Reference will here be made to the specific structure of the safety control mechanism associated in each projection assembly. Referring to Figs. IV, V and VI of the drawings, I have shown lamp-house shutter 3, which is mounted adjacent or in sliding contact with a plate 36, having therein an aperture 37 in line with light-cone 2 (Fig. I) in front of the lamp-house. Coil CR, above referred to, is one of a pair of coils CR and CL arranged to act oppositely upon a plunger 38, which has a slot and pin connection 39, with an extended arm portion 3a of the shutter 3. Movement of plunger 38 to the left in Fig. IV, under the energization of coil CL, swings the shutter from its illustrated position (in which aperture 37 is open) into a position closing such aperture. Mounted on the plate 36 are three pairs of spring contacts 42, 43 and 43a in axial alignment with the plunger 38. These contacts normally tend to stand in closed positions, and the plunger 38 is arranged to open them under predetermined conditions of operation. More specifically, the opposite terminals of the plunger carry insulating jackets 38a and 38b of hard rubber, and, when the shutter 3 is adjusted in open position (Fig. IV) the contacts 43, 43a stand in closed positions, while the insulated terminal 38a of the plunger lies between contacts 42 and holds them in electrical separation or open position. When the shutter is adjusted in aperture-closing position, obstructing the emission of light from the lamp-house, the terminal 38b of the plunger holds the contacts 43 and 43a in open positions, while the terminal 38a, withdrawn from the contacts 42, permits such contacts to stand in closed position.

Also mounted upon the plate 36 is a plunger 45 reciprocable in response to the alternate energizing of two coils 34 and 34a. The opposite terminals of the plunger 45 carry insulating jackets 45a and 45b, and, when the plunger stands in its right-hand position (Fig. IV), two pairs of contacts 50 and 50a are held in open positions, and three pairs of contacts 35, 35a and 35b stand in closed positions, while, in the alternate position of the plunger, the contacts 50, 50a are closed and contacts 35, 35a, 35b are held open.

Referring again to Fig. VII, it will be understood that the left-hand portion of the diagram illustrates the wiring of the projection assembly A which is in operation, and the right-hand portion illustrates the wiring of the inactive projection assembly I. As the advancing film in the assembly A approaches the end of its run, the contacts 16 of the switch mechanism 12 (of assembly A) are closed by the film in the manner already described. In consequence, the energizing circuit a, leading through contacts 50a and coil 34 of the control mechanism of assembly I, is closed. Thereupon, the plunger 45 of assembly I is shifted to the right; the contacts 50, 50a are opened, and contacts 35, 35a, and 35b are closed. The closing of the contacts 35 closes a circuit c leading from supply line b' to the motor 10 of assembly I. Such motor is set in operation, initiating the advance of the film in assembly I, and bringing it up to normal operating speed, before the run of film in assembly A is terminated. Incidentally, the closing of contacts 35a and 35b prepares two circuits d and e of assembly I for operations immediately to follow.

As the motor and film of assembly I reach normal operating speed, the film of assembly A effects the closing of contacts 16a (of assembly A), thereby closing circuit d, leading from supply line b and through closed contacts 35a, 42 and actuating coil CR of assembly I, with the immediate consequence and effect that the plunger 38 of assembly I is drawn into its right-hand position. The shutter 3 is swung into open position and the normal projection of pictures by assembly I begins.

This shifting of the plunger 38 opens contacts 42, and closes contacts 43 and 43a, and the closing of contacts 43a energizes the sound-producing equipment S of assembly I concurrently with the opening of the shutter. Thus, the picture-projecting apparatus and sound equipment of assembly I are brought into play at precisely the same instant. Simultaneously, with the energizing of circuit d and the initiation of complete operation of assembly I, a circuit r, f', leading from circuit d through closed contacts 43, energizes coil CL of assembly A, whereby the plunger 38 of such assembly is drawn into its left-hand position, and the shutter 3 is closed. This shifting of the plunger 38 opens contacts 43 and 43a and closes contacts 42, and the opening of the contacts 43a deenergizes the sound equipment S of assembly A. Thus, it will be perceived that the normal operation of assembly A is terminated at the same instant that the normal operation of assembly I begins.

The motor 10 of assembly A continues in operation after the shutter 3 has been closed and the sound equipment S deenergized; that is, the motor continues in operation until the tail-end of the film is entirely unwound from the reel 8 (Fig. I), and is so far withdrawn from the traps 11, 13 that one or another of such traps (described below) operates to close a circuit b, a, h, e' through the coil 34a of the control mechanism of assembly A, whereupon the plunger 45 is shifted to the left, opening contacts 35, 35a and 35b, and permitting contacts 50, 50a to close. The opening of contacts 35 interrupts the energizing circuit b, c' of the motor 10, and the motor comes to rest. The contacts 50 and 50a of the safety control mechanism of assembly A, which has now become inactive, stand in closed positions, so that assembly A may be restored to operation, when the run of film in the now active assembly I has been finished. This completes the change-over cycle, activity having been fully transferred from projection assembly A to assembly I.

While the projection assembly I is in operation, the attendant installs a new reel of film in assembly A, to carry on when the reel in assembly I has been exhausted. The operation in changing over from assembly I to assembly A is identical with that described in changing over from assembly A to assembly I. That is to say, the film in assembly I, approaching the end of its run, first operates the switch mechanism 12 of assembly I, thereby closing contacts 16 in circuit a', leading from power supply line b' to the actuating coil 34 of the control mechanism of assembly A. Thus, the plunger 45, having been standing in its left-hand position since assembly A was rendered inactive, is restored to its illustrated position, and the contacts 35 close and complete circuit $b, c'$ of motor 10, starting the motor and initiating the travel of film in assembly A in advance of the actual changeover operation. Next, the contacts 16a of assembly I are closed (by the film in assembly I), and a circuit $d'$ is completed, through closed contacts 35a and 42, to the coil CR of assembly A, whereby the shutter 3, having been in closed position since assembly A was rendered inactive, is restored to open position and the energizing circuit of sound equipment S is closed, as shown; and simultaneously therewith a circuit $d', f$ is completed through the contacts 43 of assembly I, which contacts have been standing in closed position while assembly I is in operation, to the coil CL of assembly I. In consequence, the shutter 3 of assembly I is closed, and the sound equipment S thereof is deenergized, simultaneously with the return of assembly A to normal operation. Thus, a changeover from assembly I to assembly A is accomplished. It will be understood that, when the reeling of the film in assembly I is completed, the traps 11, 13 of said assembly I, being disengaged by the film, close and complete a circuit $b', a', h', e$ to the coil 34a. Thus, the plunger 45 is restored to its illustrated position, and the energizing circuit $b', c$ of the motor 10 of assembly I is interrupted.

In the above description of the changeover operation, I mention that the traps 13 are effective to close a circuit. Considering the wiring of the traps 13, 13 of assembly A as exemplary of both assemblies A and I, it will be understood that the circuit closed is the energizing circuit $b, a, h, e'$ of the coil 34a, and that the closing of such circuit effects the shifting of plunger 45, thereby opening contacts 35, 35a, 35b, and deenergizing the motor 10. The particular construction and mode of operation of these traps 13 are fully treated with in my above-noted co-pending application for patent, and it is needless to enter into a detailed consideration herein. Suffice it to say that each trap includes a pair of electric contacts, together with means cooperating with the advancing film, normally to hold such contacts in open position in the circuit ($b, a, h, e'$) of the safety control mechanism of the projection assembly. When the run of film is completed and the film is withdrawn, as already described, the film-engaging means of the trap shift, and permit the contacts to close and complete the circuit $b, a\ h, e'$. Thus, the traps 13, or either of them, operate to effect deenergizing of the motor 10 of the projection assembly (A) which has become inactive in consequence of a changeover operation.

In each projection assembly, the traps 13, 13 are arranged one between the reel 9 and sound equipment 100 (Fig. I), and the other between such sound equipment and below the projection apparatus 1, 5. During normal operation of the projection assembly A (or I) the lower trap 13 effects safety control upon abnormal film conditions existing between the upper trap 13 and the winding reel 9. If the film should break between such points, the contacts of the lower trap 13 close (Fig. VII), and completes the circuit $b, a, h, e'$ (or $b', a', h', e$) to the coil 34a of the safety control mechanism, with the effect that the plunger 45 is shifted to the left, opening the motor-controlling contacts 35, and closing contacts 50, 50a. The closing of contacts 50, completes a circuit from charged line $e'$ (through leads $t', f'$) to the coil CL of the shutter mechanism, and in consequence the plunger 38 shifts to the left, closing the shutter 3, and opening the contacts 43a of the sound equipment S. Thus, the operation of the projection assembly is automatically terminated, and all danger is avoided of the film igniting or being harmed under the effects of the light-beam projected by the lamp-house.

It will also be understood that, if the winding reel should fail to operate, the effect would be to form a loose-loop in the film adjacent such winding reel, rather than in the regions of the film lying closer to supply reel 8, and, accordingly, the lower trap 13 would operate in the manner already described, to effect a safety control operation. In like manner the upper trap 13 operates in response to abnormal conditions in the reach of film between the projection apparatus 1—5 and the sound equipment 100, to effect the closing of the safety control circuits $b, a, h, e'$ and $t', f'$.

Trap 11 is arranged above the projection apparatus 1—5 and cooperates with the loop F' (Fig. I) formed in the film. The loop F' is formed in the film between the supply reel 8 and the point at which the film is subjected to the projecting light-beam. The loop serves to prevent whipping of the film as it passes before the light-beam. The particular structure of the trap 11 is fully described in my said co-pending application, and it will suffice herein to say that the trap operates either upon an abnormal diminution of tension on the film, or upon an abnormal increase in tension, to close the safety control circuits mentioned above, and thereby deenergize the motor, close the shutter, and open the energizing circuit of the sound equipment of the projection assembly in operation. It may be remarked that the trap 11, in operating in response to changes in size of the loop F', serves to anticipate and prevent conditions which might otherwise result in film breakage.

In my changeover and safety control assembly, I provide means, arranged to act upon the blowing of a fuse, or upon some other such line circuit interruption as would cause the motor driving winding reel 9 to cease its activity without necessarily affecting the tension of the film, it being understood that under such circumstances the movement of the film is suspended, and the light-beam from the lamp-house 1, impinging against a particular restricted area of the film, tends to injure the film, and may even ignite it. Such safety means comprise a holding magnet 65, which is connected by lines $u$ and $v$ to the input terminals (as distinguished from the ground terminals) of the motors 10, 10 of the two assemblies A and I. Thus, so long as either motor is energized and its associated projection assembly is in operation, the magnet 65 is energized, and holds an armature 67, against the tension of a spring 66, in circuit-interrupting position.

If, then, the supply of current to the active projection assembly should fail, the armature 67 swings upward, closing three pairs of contacts 68, 69, and 70 in an emergency light system including a battery B and a light L. The closing of contacts 68 and 69 effect the connection of conductors $i$ and $i'$ with the positive terminal of battery B, and the closing of contacts 70 effects the connection of the negative terminal of the battery to ground. Thus, if assembly A is in operation when the normal current supply fails, the consequent closing of the armature 67 connects the negative terminal of battery B to ground and completes a circuit $i'$, $e'$ from the positive terminal of the battery, through the coil 34a of the safety control mechanism of the assembly A, to ground. The plunger 45 is shifted to the left, thereby permitting contacts 50 to close and complete a circuit from positively charged line $e'$, through lead $t'$ and closed contacts 50, to line $f'$ leading to the coil CL of the shutter control mechanism. Accordingly, the plunger 38 is shifted to the left, and the shutter 3 of assembly A is closed. This emergency energizing circuit of the coil CL remains closed, and the signal light L, in this case arranged in the circuit between battery and ground, remains illuminated, until the abnormal conditions have been rectified and the assembly prepared for normal operation.

Alternately, if the assembly I is in operation when normal power supply fails, a circuit $i$, $e$ closes the battery B in circuit the coil 34a of such assembly; the plunger 45 is moved from normal position into its illustrated position, thereby closing contacts 50 and completing a circuit running through lead $t$ from battery-energized line $e$ to the line $f$ which is connected to the then closed contacts 43 of assembly I. Thus, the coil CL of assembly I is energized and the shutter 3 is closed.

In the structure of this invention, it is important to note (Fig. I) that the "finger" or trigger mechanism 12 is arranged immediately adjacent to the film-slot 8b in the housing of the supply reel 8, and by virtue of this arrangement the mechanism 12 does not interfere with the sound equipment. Additionally, the particular organization of the mechanism 12 adapts my changeover and safety control apparatus for ready installation in any of the various projection assemblies now in use.

As has been already described, the trigger mechanism 12 of one projection assembly advantageously initiates the film-advancing operation of the motor of the other assembly before a changeover operation is actually effected.

It will be perceived that, if the motor 10 of the inactive projection assembly is not running, the shutter of that assembly cannot be automatically opened, nor can the energizing circuit of the sound equipment S thereof be closed, when a changeover operation is attempted. This is for the reason that the plunger 45 (consider the inactive assembly I in Fig. VII) must be in its right-hand position, closing the motor circuit $b'$, $c$, before the coil CR can be energized (through circuit $b$, $d$, 35a, 42), to shift the plunger 38 of assembly I, open the shutter 3, and close the contacts 43a of the sound equipment circuit. And as already described, if the motor of the active assembly (A) should cease operation for any reason, the coil 34a (of assembly A) is energized, and the plunger 45 is shifted to the left, permitting the contacts 50 to close and energize the coil CL, whereby the shutter is closed and the sound equipment circuit opened.

In accordance with usual practice, I provide switches (W) for manually controlling the operation of the projection assemblies, it being understood that the shutters 3 and plungers 38 may be manually thrown, to effect a changeover operation.

The apparatus described above is susceptible to modification and refinement without departing from the essence of invention defined in the following claims.

I claim as my invention:

1. In combination with two motion picture projection assemblies, one normally active while the other is inactive, and each comprising a shuttered lamp-house, a projector and motor-driven reels arranged to propel a film between the lamp house and the projector; an automatic changeover and safety control mechanism organized with each assembly and including two plungers and electromagnetic means arranged to shift each plunger between alternate positions, one plunger of the mechanism effecting by its movement between alternate positions the alternate opening and closing of the shutter of its associated projection assembly, and the second plunger of the mechanism effecting by its movement between alternate positions the opening and closing of contacts in the energizing circuits of the electromagnetic means of said shutter-operating plunger and in the energizing circuit of the film-advancing motor of the assembly with which it is organized, and a film-operated switch mechanism included in each projection assembly, the switch mechanism of the active assembly being operable first to energize the electromagnetic means of the second plunger of the changeover and control mechanism of the inactive assembly and then to energize the electromagnetic means of the shutter-operating plungers of both assemblies, whereby the shutter of the active assembly is closed and the shutter of the inactive assembly is opened.

2. In combination with two motion picture projection assemblies, one normally active while the other is inactive, and each comprising a shuttered lamp-house, a projector and motor-driven reels arranged to propel a film between the lamp house and the projector; an automatic changeover and safety control mechanism organized with each assembly and including two plungers and electromagnetic means arranged to shift each plunger between alternate positions, one plunger of the mechanism effecting by its movement between alternate positions the alternate opening and closing of the shutter of its associated projection assembly, and the second plunger of the mechanism effecting by its movement between alternate positions the opening and closing of contacts in the energizing circuits of the electromagnetic means of said shutter-operating plunger and in the energizing circuit of the film-advancing motor of the assembly with which it is organized, and a film-operated switch mechanism included in each projection assembly, the switch mechanism of the active assembly being operable first to energize the electromagnetic means of the second plunger of the changeover and control mechanism of the inactive assembly and then to energize the electromagnetic means of the shutter-operating plungers of both assemblies, whereby the shutter of the active assembly is closed and the shutter of the inactive assembly is opened, and means for preventing the shutter-opening operation of the mechanism of said inactive assembly if the motor circuit of such assembly is deenergized.

3. In an installation of two motion picture projection assemblies including each a lamp-house, a projector, sound-reproducing apparatus, means including an electric motor for advancing film through said projector and sound-reproducing apparatus, and switch mechanism and an electric trap arranged to cooperate with the advancing film; the combination of a changeover and safety control mechanism arranged with each projection assembly, each of said mechanisms including a shutter arranged between the lamp-house and the projector of the projection assembly with which it is associated, a plunger movable between alternate positions for opening and closing said shutter, a shutter-opening coil and a shutter-closing coil for so moving said plunger, an energizing circuit for each of said coils, each circuit including a pair of contacts adapted to be alternately opened and closed when said plunger shifts between its alternate positions, a second pair of contacts in each of said circuits, and a second plunger in each of said mechanisms including actuating coils for alternately opening and closing said second pairs of contacts in said circuits.

4. In an installation of two motion picture projection assemblies including each a lamp-house, a projector, sound-reproducing apparatus, means including an electric motor for advancing film through said projector and sound-reproducing apparatus, and switch mechanism and an electric trap arranged to cooperate with the advancing film; the combination of a changeover and safety control mechanism arranged with each projection assembly, each of said mechanisms including a shutter arranged between the lamp-house and the projector of the projection assembly with which it is associated, a plunger movable between alternate positions for opening and closing said shutter, a shutter-opening coil and a shutter-closing coil for so moving said plunger, an energizing circuit for each of said coils, each circuit including a pair of contacts adapted to be alternately opened and closed when said plunger shifts between its alternate positions, a second pair of contacts in each of said circuits, and plunger means including actuating coils for alternately opening and closing said second pairs of contacts in said circuits, a pair of contacts for controlling said sound-reproducing apparatus, said contacts standing in open position when said plunger stands in shutter-closing position.

5. In an installation of two motion picture projection assemblies including each a lamp-house, a projector, sound-reproducing apparatus, means including an electric motor for advancing film through said projector and sound-reproducing apparatus, and switch mechanism and an electric trap arranged to cooperate with the advancing film; the combination of a changeover and safety control mechanism arranged with each projection assembly, each of said mechanisms including a shutter arranged between the lamp-house and the projector of the projection assembly with which it is associated, a plunger movable between alternate positions for opening and closing said shutter, a shutter-opening coil and a shutter-closing coil for so moving said plunger, an energizing circuit for each of said coils, each circuit including a pair of contacts adapted to be alternately opened and closed when said plunger shifts between its alternate positions, a second pair of contacts in each of said circuits, and plunger means including actuating coils for alternately opening and closing said second pairs of contacts in said circuits, and an energizing circuit of one of the actuating coils of said last plunger means including said electric trap and a pair of contacts movable between open and closed positions in response to the shifting of said last plunger means between its alternate positions.

6. In an installation of two motion picture projection assemblies including each a lamp-house, a projector, sound-reproducing apparatus, means including an electric motor for advancing film through said projector and sound-reproducing apparatus, and switch mechanism and an electric trap arranged to cooperate with the advancing film; the combination of a changeover and safety control mechanism arranged with each projection assembly, each of said mechanisms including a shutter arranged between the lamp-house and the projector of the projection assembly with which it is associated, a plunger movable between alternate positions for opening and closing said shutter, a shutter-opening coil and a shutter-closing coil for so moving said plunger, an energizing circuit for each of said coils, each circuit including a pair of contacts adapted to be alternately opened and closed when said plunger shifts between its alternate positions, a second pair of contacts in each of said circuits, and a second plunger in each of said mechanisms including actuating coils for alternately opening and closing said second pairs of contacts in said circuits, said energizing circuit of the closing coil of said first plunger including a pair of contacts controlled by the last plunger means.

7. In an installation of two motion picture projection assemblies including each a lamp-house, a projector, sound-reproducing apparatus, means including an electric motor for advancing film through said projector and sound-reproducing apparatus, and switch mechanism and an electric trap arranged to cooperate with the advancing film; the combination of a changeover and safety control mechanism arranged with each projection assembly, each of said mechanisms including a shutter arranged between the lamp-house and the projector of the projection assembly with which it is associated, a plunger movable between alternate positions for opening and closing said shutter, a shutter-opening coil and a shutter-closing coil for so moving said plunger, an energizing circuit for each of said coils, each circuit including a pair of contacts adapted to be alternately opened and closed when said plunger shifts between its alternate positions, a second pair of contacts in each of said circuits, and a second plunger in each of said mechanisms including actuating coils for alternately opening and closing said second pairs of contacts in said circuits, said energizing circuit of the opening coil of said first plunger including a pair of contacts controlled by the last plunger means.

8. In an installation of two motion picture projection assemblies including each a lamp-house, a projector, sound-reproducing apparatus, means including an electric motor for advancing film through said projector and sound-reproducing apparatus, and switch mechanism and an electric trap arranged to cooperate with the advancing film; the combination of a changeover and safety control mechanism arranged with each projection assembly, each of said mechanisms including a shutter arranged between the lamp-house and the projector of the projection assembly with which it is associated, a plunger movable between alternate positions for opening and closing said shutter, a shutter-opening coil and a shutter-closing coil for so moving said plunger, an energizing circuit for each of said coils, each circuit including a pair of contacts adapted to be alternately opened and closed when said plunger shifts between its alternate positions, a second pair of contacts in each of said circuits, and plunger means including actuating coils for alternately opening and closing said second pairs of contacts in said circuits, said energizing circuit of the opening coil of the first plunger of the safety control mechanism of the first projection assembly including a pair of contacts controlled by the last plunger means of such mechanism, and said last pair of contacts being included in circuit with the switch mechanism of the second projection assembly.

9. In an installation of two motion picture projection assemblies including each a lamp-house, a projector, sound-reproducing apparatus, means including an electric motor for advancing film through said projector and sound-reproducing apparatus, and switch mechanism and an electric trap arranged to cooperate with the advancing film; the combination of a changeover and safety control mechanism arranged with each projection assembly, each of said mechanisms including a shutter arranged between the lamp-house and the projector of the projection assembly with which it is associated, a plunger movable between alternate positions for opening and closing said shutter, a shutter-opening coil and a shutter-closing coil for so moving said plunger, an energizing circuit for each of said coils, each circuit including a pair of contacts adapted to be alternately opened and closed when said plunger shifts between its alternate positions, a second pair of contacts in each of said circuits, and plunger means including actuating coils for alternately opening and closing said second pairs of contacts in said circuits, said energizing circuit of the opening coil of the first plunger of the safety control mechanism of the first projection assembly including a pair of contacts controlled by the last plunger means of such mechanism, and said last pair of contacts being included in circuit with the switch mechanism of the second projection assembly, and said energizing circuit of the closing coil of such first plunger of said switch mechanism of the first projection assembly being included in circuit with the switch mechanism of said first projection assembly.

10. In an installation of two motion picture projection assemblies including each a lamp-house, a projector, sound-reproducing apparatus, means including an electric motor for advancing film through said projector and sound-reproducing apparatus, and switch mechanism and an electric trap arranged to cooperate with the advancing film; the combination of a changeover and safety control mechanism arranged with each projection assembly, each of said mechanisms including a shutter arranged between the lamp-house and the projector of the projection assembly with which it is associated, a plunger movable between alternate positions for opening and closing said shutter, a shutter-opening coil and a shutter-closing coil for so moving said plunger, an energizing circuit for each of said coils, each circuit including a pair of contacts adapted to be alternately opened and closed when said plunger shifts between its alternate positions, a second pair of contacts in each of said circuits, and plunger means including actuating coils for alternately opening and closing said second pairs of contacts in said circuits, said energizing circuit of the opening coil of the first plunger of the safety control mechanism of the first projection assembly including a pair of contacts controlled by the last plunger means of such mechanism, and said last pair of contacts being included in circuit with the switch mechanism of the second projection assembly, and said energizing circuit of the closing coil of such first plunger of said switch mechanism of the first projection assembly being included in circuit with the switch mechanism of said first projection assembly, and a circuit including the electric trap and a pair of contacts controlled by the plunger means of said first projection assembly for energizing said closing coil of the first projection assembly independently of said switch mechanism.

11. Changeover and safety control apparatus for an installation including two motion picture projection assemblies, each equipped with a lamp-house shutter; said apparatus including two electro-magnetic plungers for each projection assembly and means including electro-magnetic coils for shifting said plungers severally between alternate positions, one of the two plungers in each pair of plungers being connected to the lamp-house shutter of the associated projection assembly and adapted in its movement between alternate positions to shift said shutter between open and closed positions, and a system of electrical wiring including circuits for selectively energizing said electro-magnets, a plurality of electric contacts organized with and controlled by each of said plungers, certain of the contacts in one assembly being included in energizing circuits of electro-magnets in the other assembly, and in each assembly certain of the control contacts actuated by one of the plungers being included in the energizing circuit of an electro-magnet of the other plunger.

FRANK PEDATELLA.